United States Patent Office.

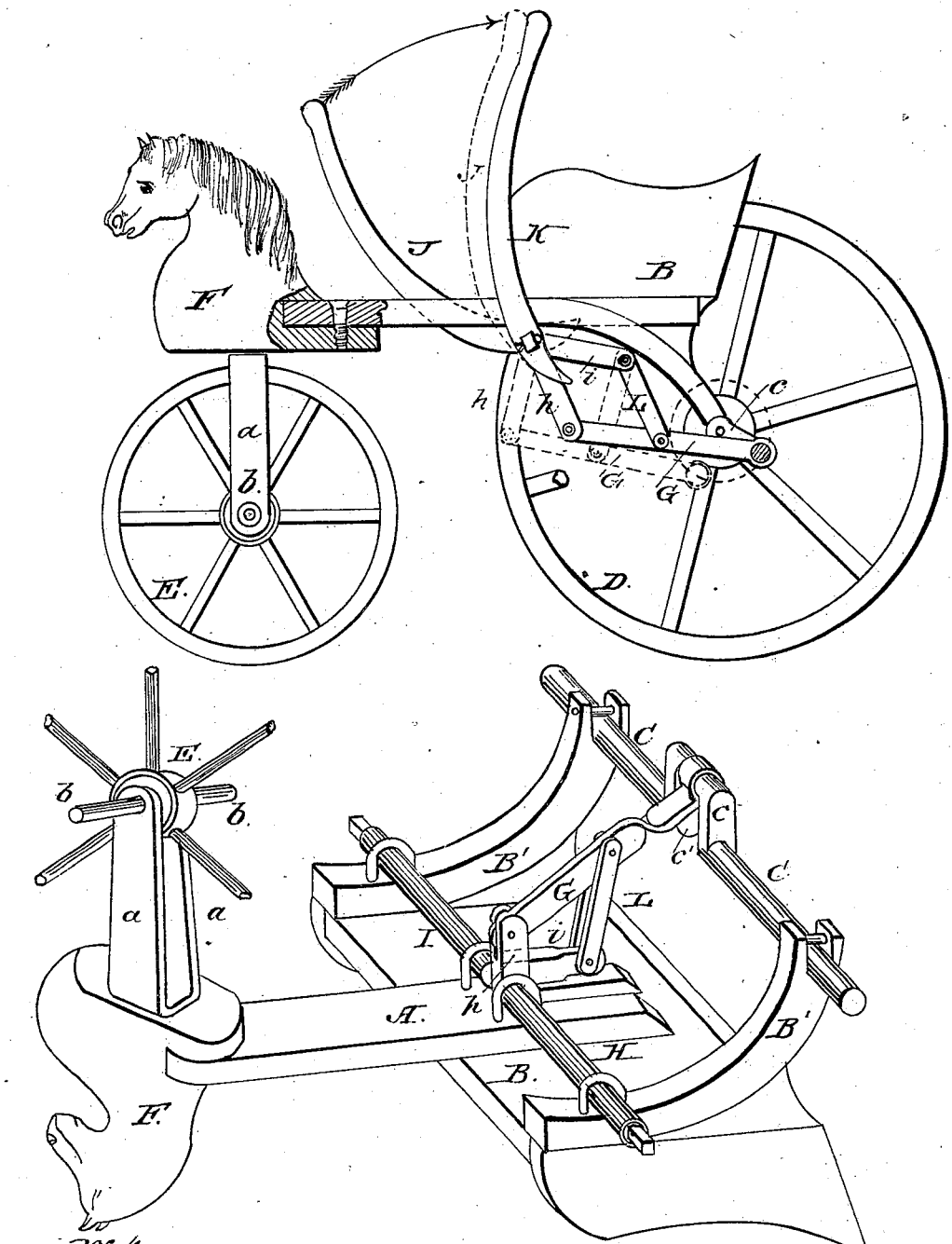

JOHN REINHART, OF NEW YORK, N. Y., ASSIGNOR TO A. CHRISTIAN.

Letters Patent No. 87,290, dated February 23, 1869.

IMPROVEMENT IN VELOCIPEDE.

The Schedule referred to in these Letters Patent and making part of the same.

*To all whom it may concern:*

Be it known that I, JOHN REINHART, of the city, county, and State of New York, have invented a new and useful Improvement in Velocipedes; and I do hereby declare that the following is a full, clear, and exact description of the same, reference being had to the accompanying drawing, which forms part of this specification.

This invention relates to an improved mechanism for operating the axle of the driving-wheels of a velocipede.

The invention consists in the combination, with the axle of the driving-wheels of a velocipede, or similar vehicle, of a pitman connected to the crank, a link, or connecting-rod, two rock-shafts, and two actuating-levers, or handles, whereby the liability of a "dead-point" occurring is entirely obviated, and a means for easily propelling a velocipede with great rapidity is obtained.

In the accompanying drawing—

Figure 1 is a side elevation, partly in section, of a velocipede, showing my invention applied thereto.

Figure 2 is an inverted perspective view of the same.

Similar letters of reference indicate like parts in both figures.

A B designate the body of a velocipede, the part A being supported by the axle C of the driving-wheels D, (only one being shown,) and the part B by a front or steering-wheel or wheels E.

In the example shown in the drawing there is a seat mounted upon braces B' B', (see fig. 2,) whose lower ends form the bearings for the axle C, and the part A, to which the seat B is also secured, is pivoted to a block, F, (shown as of the shape of a horse's head and shoulders,) which has arms $a\ a$ extending downward, between which the steering-wheel E is axled.

A pin or pins, $b\ b$, projecting from the arms $a\ a$, serve as a rest for the feet when guiding the steering-wheel.

I will here remark that the velocipede may be of any suitable construction. My improvement relates to the mechanism by which the driving-wheels are operated, and hence may be applied to velocipedes, or like vehicles, of various constructions.

The axle C carries a crank, $c$, to which is secured a pitman, G.

H I are two rock-shafts secured to the body of the velocipede, and each rock-shaft carries a bent end, $h\ j$, as will be seen by reference to fig. 2.

J K are the handles or operating-levers, formed with or secured to the outer ends of the rock-shafts H I.

The bent end, $h$, of the shaft H, is pivoted to the pitman G, and the bent end, $i$, of the shaft I, is pivoted to one end of a link, or connecting-rod, L, the other end of the latter being pivoted to the pitman G.

By reference to fig. 1, it will be observed that when the pitman is in a nearly horizontal position, the lever J will have no power to overcome the "dead-point." This, however, is readily overcome by operating the lever K, as the bent end of the shaft I, by means of the connecting-link L, depresses or raises the pitman, and hence continues the rotation of the driving-axle; and, on the other hand, when the crank is in a vertical position, parallel, or nearly so, with the link L, as shown in red outline in fig. 2, there will be a "dead-point," which the lever K does not overcome, but which can be readily overcome by operating the other lever, J. So, therefore, by operating both levers, no "dead-point" can at any time occur.

What I claim as my invention, and desire to secure by Letters Patent, is—

An operating-device for a velocipede, or like-propelled vehicle, consisting of the combination, with the axle of the driving-wheels thereof, of a pitman connected to the crank, a link, or connecting-rod, two rock-shafts, with angular ends, and two actuating-levers or handles, all arranged and operating substantially as herein specified.

JOHN REINHART.

Witnesses:
JAMES McGILL,
JOHN K. HAWKINS.